United States Patent [19]

Segredo et al.

[11] Patent Number: 4,606,205

[45] Date of Patent: Aug. 19, 1986

[54] APPLIED FORCE MONITOR FOR APPARATUS FOR FORMING PRODUCTS FROM SHEET MATERIAL

[75] Inventors: Anthony F. Segredo, Bloomingdale; Richard E. Prendergast, Western Springs; Ralph E. Martin, Oak Lawn; Jack W. Pluister, Tinley Park; Manuel T. Techico, Downers Grove, all of Ill.

[73] Assignee: Continental Can Company, Inc., Stamford, Conn.

[21] Appl. No.: 782,463

[22] Filed: Oct. 1, 1985

Related U.S. Application Data

[63] Continuation-in-part of Ser. No. 669,716, Nov. 9, 1984, Pat. No. 4,600,347.

[51] Int. Cl.[4] .............................................. B21B 37/08
[52] U.S. Cl. ......................................... 72/19; 413/27; 413/30; 73/774
[58] Field of Search .................... 72/4, 12, 19; 73/774, 73/777; 413/6, 3, 26, 30, 31

[56] References Cited

U.S. PATENT DOCUMENTS

| 3,465,703 | 9/1967 | Jantze et al. | 413/30 |
| 4,022,141 | 5/1977 | Barlenstein | 413/40 |
| 4,205,617 | 6/1980 | Chmielowiec | 72/19 |

Primary Examiner—Leon Gilden
Attorney, Agent, or Firm—Charles E. Brown

[57] ABSTRACT

This relates to an applied force monitor which is associated with sheet material forming mechanisms so as to determine whether sheet material is being properly formed by the amount of force applied in the formation thereof. A typical force applying member would be a cam. Suitable strain gauges are associated with the force applying member with the strain gauges being coupled in a bridge having a voltage output which is indicative of the applied force and which is directed to a microcomputer into which suitable indicia is selectively fed and such indicia will include high and low forces which would be indicative of a fault. The microcomputer includes a memory in which the faults are stored and in addition to indicating when individual faults do occur, the memory, when excess faults are determined, will serve to shut down the associated machine. Data may be visually displayed or may be permanently recorded by way of a printer.

19 Claims, 6 Drawing Figures

APPLIED FORCE MONITOR FOR APPARATUS FOR FORMING PRODUCTS FROM SHEET MATERIAL

This application is a continuation-in-part of our application Ser. No. 669,716 filed Nov. 9, 1984, now U.S. Pat. No. 4,600,347.

This invention relates in general to apparatus for forming products from sheet material and more particularly to a monitoring system monitoring the force applied by the apparatus so as to obtain an indication of the proper forming of the product.

Most particularly, it has been found that one can determine the proper forming of sheet material, particularly sheet metal wherein there is a bending or folding of the metal by monitoring the force required to effect such forming of the sheet material. The invention is particularly adaptable to the can making industry wherein there are numerous folding operations including the flanging of ends of can bodies for receiving end units; forming double seams between the end units and the can bodies; and like folding operations.

Although the invention is particularly adapted for use in conjunction with a forming cam, and such cam may either be rotated or stationary, the invention is applicable to use in conjunction with forming apparatus wherein there is a force applying member which is placed under stress in the product forming operation.

For purposes of simplicity, the invention will be described in conjunction with double seam forming can closing machines.

A typical double seaming machine is disclosed in the U.S. patent to Jantze et al, U.S. Pat. No. 3,465,703, granted Sept. 9, 1969. In a typical application of this invention, the machine of the Jantze et al patent is modified by modifying the cam 26 thereof.

When cans are closed in accordance with the known prior art, as exemplified by the above-identified Jantze et al patent, the cans must have the double seams thereof individually checked for tightness. This is a time consuming operation and, furthermore, only a limited number of cans will be inspected.

In accordance with one usage of this invention, it is proposed to provide the second seaming operation track of the cam with sensors which will be indicative of the load or force applied in the second seaming operation which, in turn, is directly indicative of the tightness of the double seam.

The sensors carried by the cam track will be coupled to a monitoring system which will indicate when a high and/or low force is applied. The monitoring system will include a printer which will print when a high or low condition exists and identify that station of the machine wherein the fault occurs. Further, the monitoring system may include a fault storage which may be set to identify faults of an unacceptable number. The fault storage may be said to identify excessive faults on a percentage basis, for example faults in excess of one per thousand, or may indicate when a preselected number of faulty seams are formed in sequence at a particular station of the machine and will identify the faulty station for appropriate steps by the machine operator.

Should the force applying member, such as a cam, be of a very heavy construction, the force applying member may be weakened in a selected portion thereof so as to be deformable in accordance with the load imposed thereon. For example, in a double seaming machine, the cam lobe of the second operation track may be so separated from the remainder of the cam so as to be deformable in accordance with the reactive load applied thereto by a cam follower for a respective operation roll.

With the above and other objects in view that will hereinafter appear, the nature of the invention will be more clearly understood by reference to the following detailed description, the appended claims, and the several views illustrated in the accompanying drawings.

It is to be understood that a typical can closing machine or double seaming apparatus, as disclosed in Jantze et al U.S. Pat. No. 3,465,703, will have a main shaft and will be of the turret type. Such a machine is provided with eight stations although the number of stations may vary and is not a part of this invention. Each station is constructed to include a base on which a can is to be seated and an inner chuck which engages the end unit which is to be applied to the can body.

In the forming of a double seam there are two operations with the first operation being formed by a first operation roll and the second operation being formed separate and apart from the first operation by a second operation roll. The rolls are mounted for rotation and further are pivotal so that they may be moved radially inwardly relative to an assembled end unit and can body to effect the folding of the outer peripheral portion of the end unit and the seaming flange of the can body. The support for each of the seaming rolls carries a cam follower. Each cam follower for the first operation rolls engages a first track on the cam and each cam follower for the second operation rolls engages a second operation track on the cam.

The general environment of an example of this invention having been briefly described, reference is now made to the drawings.

Figure 1:
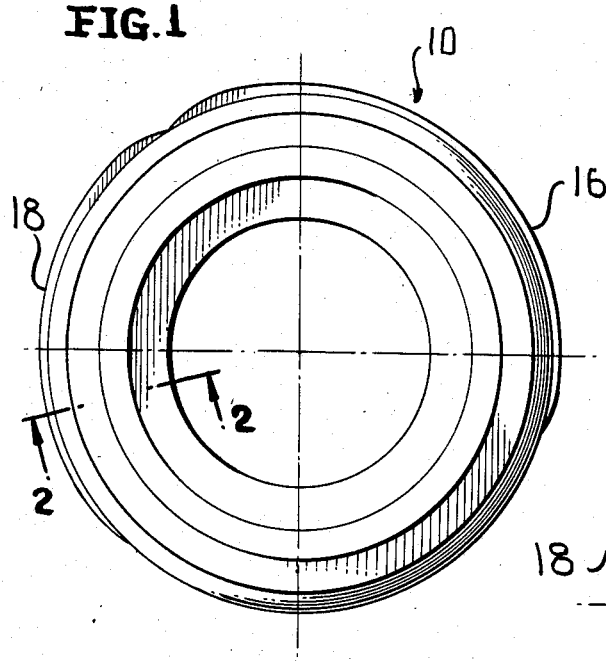
FIG. 1 is a plan view of the seaming cam of a double seaming machine.

In FIG. 1 there is illustrated a typical double seam forming apparatus or can closing machine cam which is generally identified by the numeral 10 and which corresponds to the cam 26 of U.S. Pat. No. 3,465,703 described above.

Figure 2:
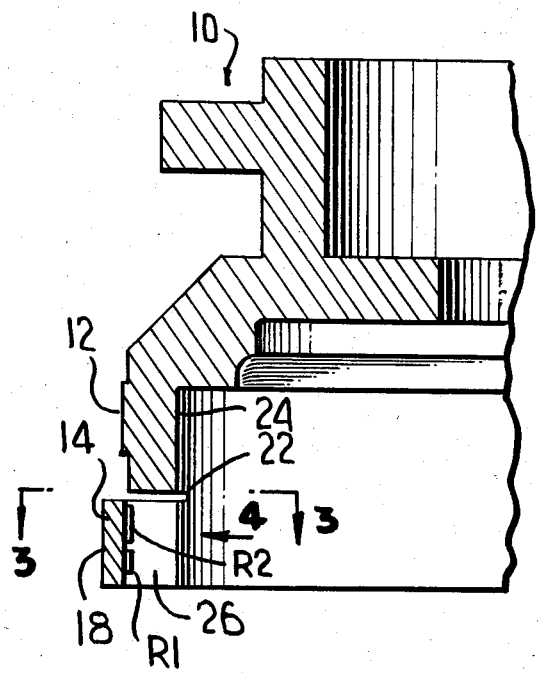
FIG. 2 is an enlarged fragmentary vertical sectional view taken generally along the line 2—2 of FIG. 1, and shows the specific cross section of the cam intermediate the second track lobe ends.

The cam 10 has, as is best shown in FIG. 2, an upper first operation track 12 and a lower second operation track 14. The first operation track 12 has a radially outwardly projecting lobe 16 while the second operation track 14 has a radially projecting lobe 18. Inasmuch as this invention in the illustrated embodiment, relates to the monitoring of the tightness of the formed double seams, this invention relates to the modification of the cam 10 solely in the area of the second operation track 14 and more specifically in the area of the dwell portion 20 (FIG. 3) of the lobe 18.

Figure 3:
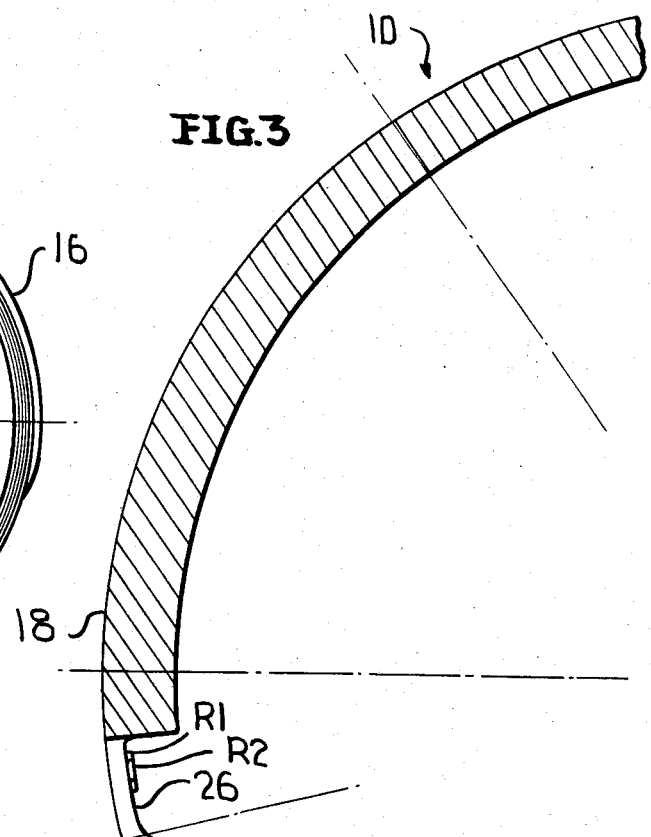
FIG. 3 is a fragmentary horizontal sectional view taken generally along the line 3—3 of FIG. 2, and shows the cross section of the cam along the second operation track lobe and the placement of sensors relative thereto.
Figure 4:
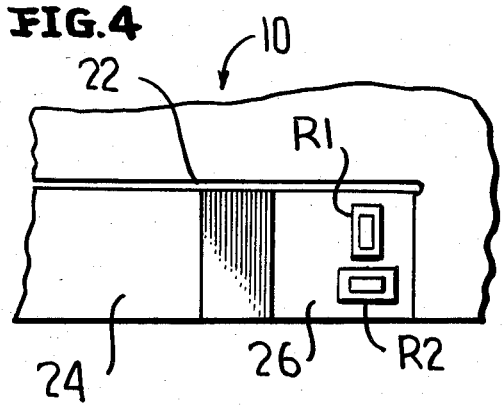
FIG. 4 is an enlarged fragmentary elevational view of the interior of the cam taken in the direction of the arrow 4 of FIG. 2, and shows more specifically the mounting of the sensors.

In accordance with this invention and as is clearly shown in FIGS. 2–4, the cam 10 is provided with a saw slit 22 and a radial inner surface 24 of the cam 10 is preferably formed with a pair of notches or recesses 26, 28. The machined notch 26 has mounted on an inner wall surface thereof a strain gauge R1 which is elongated in the circumferential direction of the cam. Also mounted on the inner surface of the machined notch 26 is a strain gauge R2 which is elongated in the vertical direction and which, as is best shown in FIG. 4, is placed in radial alignment with the strain gauge R1.

A similar pair of strain gauges R3 and R4 are mounted on the inner surface of the machined notch 28. The strain gauge R3 corresponds generally to the strain gauge R2 and is elongated in the axial direction while the strain gauge R4 corresponds generally to the strain gauge R1 and is elongated in the circumferential direction.

At this time it is pointed out that the strain gauges R1 and R4 are distorted by deflection of the high dwell portion 20 of the second operation track 14. The strain gauges R2, R3 are also in part distorted by the deflection of the high dwell portion 20. However, they are also subject to distortion of the high dwell portion 20 due to temperature changes. Thus the strain gauges R2, R3 will balance out any temperature resultant distortions when utilized in a bridge in a manner to be described hereinafter. The strain gauges R2, R3 will also reflect the deflection of the high dwell portion 20 due to the force applied thereon by the associated cam follower.

Figure 5:
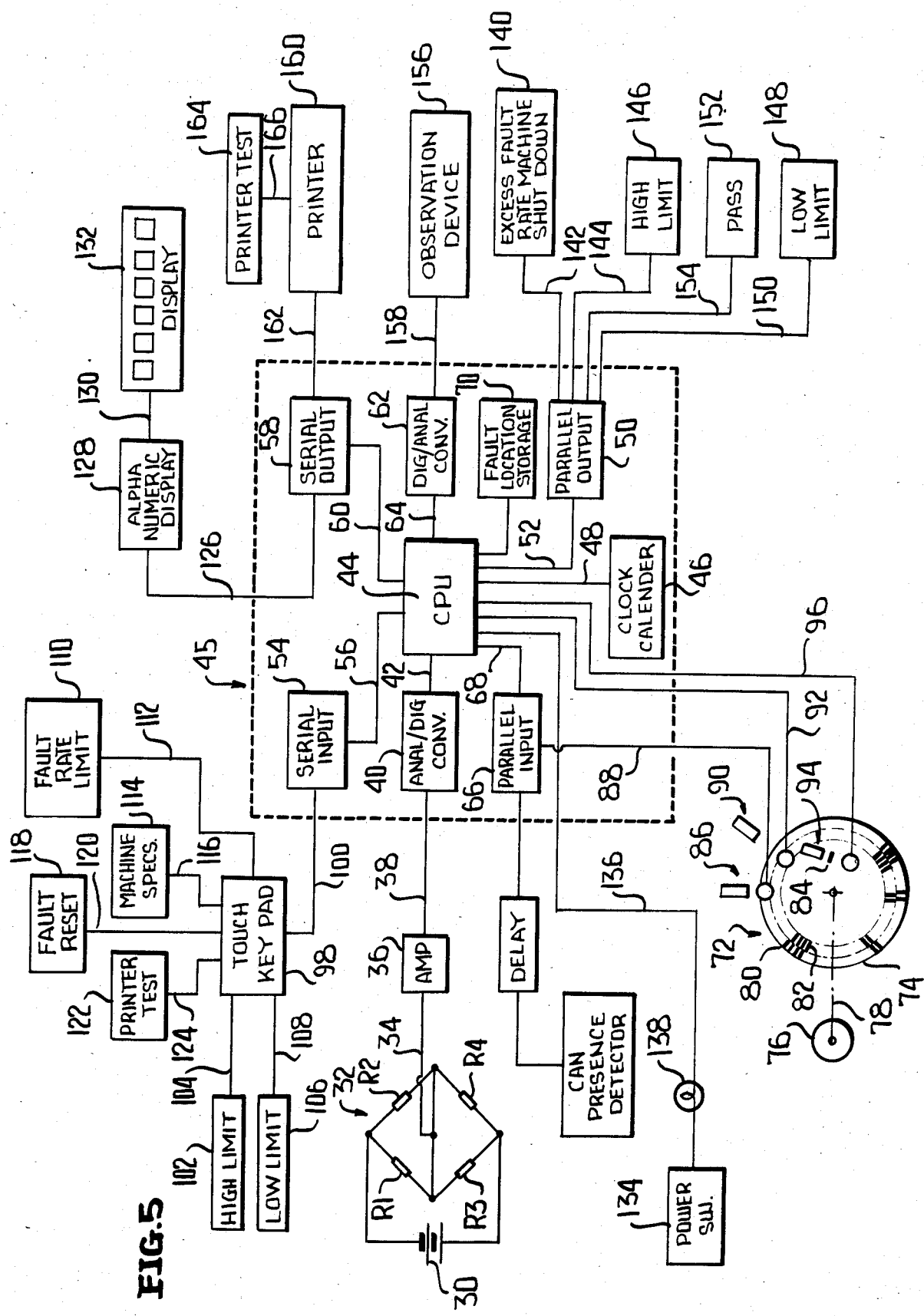
FIG. 5 is a wiring schematic of the monitoring system including a microcomputer.

The strain gauges R1–R4 are conventional metal foil strain gauges and are mounted in an active bridge configuration as shown at the left of the wiring schematic of FIG. 5. There is a power supply 30 coupled to two opposite corners of the bridge generally identified by the numeral 32, and the other two corners of the bridge 32 are coupled together to provide a voltage output in a line 34 leading to an AMPLIFIER 36. The AMPLIFIER 36 is coupled by means of a line 38 to an ANALOG TO DIGITAL CONVERTER 40 which is part of a microcomputer generally identified by the numeral 45. The microcomputer 45 includes a CPU (central processing unit) 44 to which the ANALOG TO DIGITAL CONVERTER 40 is connected by way of a line 42.

The microcomputer 45 includes a plurality of other components including a CLOCK CALENDAR 46 which is connected to the CPU 44 by a line 48, a PARALLEL OUTPUT 50 which is connected to the CPU by a line 52, a SERIAL INPUT 54 which is connected to the CPU 44 by a line 56, a SERIAL OUTPUT 58 which is connected to the CPU 44 by a line 60, a DIGITAL TO ANALOG CONVERTER 62 which is connected to the CPU 44 by a line 64, and a PARALLEL INPUT 66 connected to the CPU 44 by a line 68. At this time it is pointed out that the CPU 44 has a memory which includes a FAULT LOCATION STORAGE which is specifically illustrated and identified by the numeral 70.

In addition to the input into the microcomputer 45 from the AMPLIFIER 36, there are a number of other inputs. There is an encoder assembly 72 which includes a disk 74 which is coupled to a drive shaft 76 of an associated machine by way of a suitable drive 78.

The disk 74 has adjacent the outer periphery thereof a suitable number of notches in two series, 80 and 82 which are slightly circumferentially offset with respect to each other. The disk 74 will also be provided with an inner single notch 84.

The encoder assembly 72 is provided with a light transmitter and receiver pair for each of the sets of notches. This includes a light transmitter and receiver pair 86 for the set of notches 80 with the receiver thereof being connected by a line 88 to the PARALLEL INPUT 66. A like light transmitter and receiver pair 90 is associated with the notches 82 with the receiver being connected by a line 92 to the CPU 44. Finally, there is a light transmitter and receiver pair 94 associated with the single notch 84 and the receiver thereof is connected by a line 96 to the CPU 44.

The notches 80 and 82 will be provided in a number n wherein typically 1200 to 2400 pulses will be transmitted to the PARALLEL INPUT 66 and the CPU 44, respectively, for each rotation of the shaft 76. On the other hand, the light transmitter and receiver pair 94 provides but a single pulse per machine revolution to the CPU 44.

It is to be understood that the pulse through the line 88 will be at the same rate as that of the pulse through the line 92, but will be in quadriture with the pulses of line 92 in a known manner. This relationship permits the determination of the direction of rotation of the machine with which the microcomputer 45 is associated.

When the machine has eight stations, there will be n/8 number of pulses per station. At each station, a typical can having an end unit double seamed thereto rotates 1.1 revolution per double seaming second operation, and during the double seaming second operation there will be involved typically on the order of 100 pulses so that the monitoring system, in effect, "looks at" the tightness of the seam 100 times per second operation double seaming.

Other inputs are directed into the microcomputer 45 manually through a TOUCH KEY PAD 98 which is connected to the SERIAL INPUT 54 by way of a line 100.

The inputs into the TOUCH KEY PAD include a HIGH LIMIT 102 through a line 104 and a LOW LIMIT 106 through a line 108. In this manner the high and low limits for the force are set into the microcomputer 45.

A FAULT RATE LIMIT 110 is connected to the TOUCH KEY PAD 98 through a line 112 for manual setting of the percentage of permissible faults or for setting the number of faults which may occur in sequence without machine shut down.

The specifications of the machine with which the monitor is associated may be set by way of a MACHINE SPECS 114 which is connected to the TOUCH KEY PAD 98 by a line 116.

It is to be understood that the machine will be shut down when there occurs excessive faults. This will be described in more detail. In order that the monitor may be reset, there is a FAULT RESET 118 which is connected to the TOUCH KEY PAD 98 by way of a line 120.

As will be described hereinafter, the monitor also includes a PRINTER. In order that a printer test may be ordered through the TOUCH KEY PAD 98, there is a PRINTER TEST 122 which is also connected to the TOUCH KEY PAD 98 through a line 124.

It will be seen that there is associated with the SERIAL OUTPUT 58 by way of a line 126 an ALPHA NUMERIC DISPLAY 128 which may be used to display individually various inputs into the microcomputer 45. The ALPHA NUMERIC DISPLAY 128 is connected by a line 130 to a DISPLAY 132 which has a plurality of individual displays for such items as forces, faults, high fault limits, low fault limits, rejects and production.

Power is directed into the microcomputer 45 from a power supply by way of a POWER SWITCH 134 which is connected to the CPU 44 by way of a line 136. The line 136 has incorporated therein a lamp 138 for indicating when power is supplied to the microcomputer 45.

The microcomputer 45 has a number of outputs supplied by the PARALLEL OUTPUT 50. First of all, when there is excess fault, the machine will be shut down by an EXCESS FAULT RATE MACHINE SHUT DOWN 140 which is connected to the PARALLEL OUTPUT 50 by a line 142.

In order that the force involved at a particular station at a particular time may be indicated to an observer, there is provided a HIGH LIMIT light 146 which is connected to the PARALLEL OUTPUT 50 by a line 144. In a like manner, there will be a LOW LIMIT light 148 which is connected to the PARALLEL OUTPUT 50 by a line 150. The lights 146 and 148 will be preferably red in color.

There is also a PASS light 152 which is connected to the PARALLEL OUTPUT 50 by a line 154 for the purpose of indicating when the force being observed is within the set limits. The light 152 will be preferably green in color.

There is an OBSERVATION DEVICE 156 which is coupled to the DIGITAL TO ANALOG CONVERTER 62 by a line 158. The OBSERVATION DEVICE 156 is utilized to observe the monitored strains through any type of observation device including, for example, an oscilloscope, a recorder or a voltmeter.

Finally, there is a PRINTER 160 which is connected to the SERIAL OUTPUT 58 through a line 162. The PRINTER 160, when actuated, will print the identification of the specific machine, the station being monitored, forces, faults and the like. Directly associated with the PRINTER 160 is a PRINTER TEST button 164 which is coupled to the PRINTER 160 by a line 166.

At this time, it will be seen that operation of the PRINTER 160 may also be requested by way of the PRINTER TEST button 122 which is associated with the TOUCH KEY PAD 98.

As previously described, the fault rate limit may be set into the microcomputer 45 through the TOUCH KEY PAD 98. As each station of the machine passes the high dwell portion of the second operation cam track 14, the deformation of that portion of the second operation cam track 14 will be monitored by the strain gauges R1-R4 at each pulse of the 100 or so pulses that will be emitted during the second operation double seam forming step. It is to be understood that the memory of the CPU 44 will be set for a selected fault rate limit through the FAULT RATE LIMIT device 110.

For example, the CPU 44 may be set for a predetermined percentage of faults in its program, for example 0.1%. On the other hand, the CPU 44 may be set for a predetermined number of sequential faults, for example 20. Thus, when the fault rate at any one of the stations of the machine exceeds the set limit, the EXCESS FAULT RATE MACHINE SHUT DOWN 140 will be activated to shut down the machine. The EXCESS FAULT RATE MACHINE SHUT DOWN 140 has a latch at its output so as to remain active until it is reset. This is accomplished by way of the FAULT RESET button 118.

When the deformation of the portion of the second operation cam track 14 is being monitored by the strain gauges R1-R4, should the monitored strain or force be within the set limits, the green PASS light 152 will be illuminated. On the other hand, if the monitored force is high or low, either the HIGH LIMIT light 146 or LOW LIMIT light 148 will be illuminated.

In the event at any time during the monitoring of a second operation double seaming there is monitored a force above or below the preset limits, a signal will be delivered from the CPU 44 through the SERIAL OUTPUT 58 to the PRINTER 160. The PRINTER 160 will typically indicate the machine number, the time and date, the station, and the value of the over or under limit force. Unless one of the PRINTER TESTS is actuated, if the seaming operation is within the set limits, there will be no printout.

It is to be understood that normally the monitoring system will be mounted in a suitable cabinet (not shown) which will have all of the various indicator lights and displays mounted therein as well as the TOUCH KEY PAD 98 and the inputs associated therewith. Thus all available information will be made immediately available to an operator.

Figure 6:
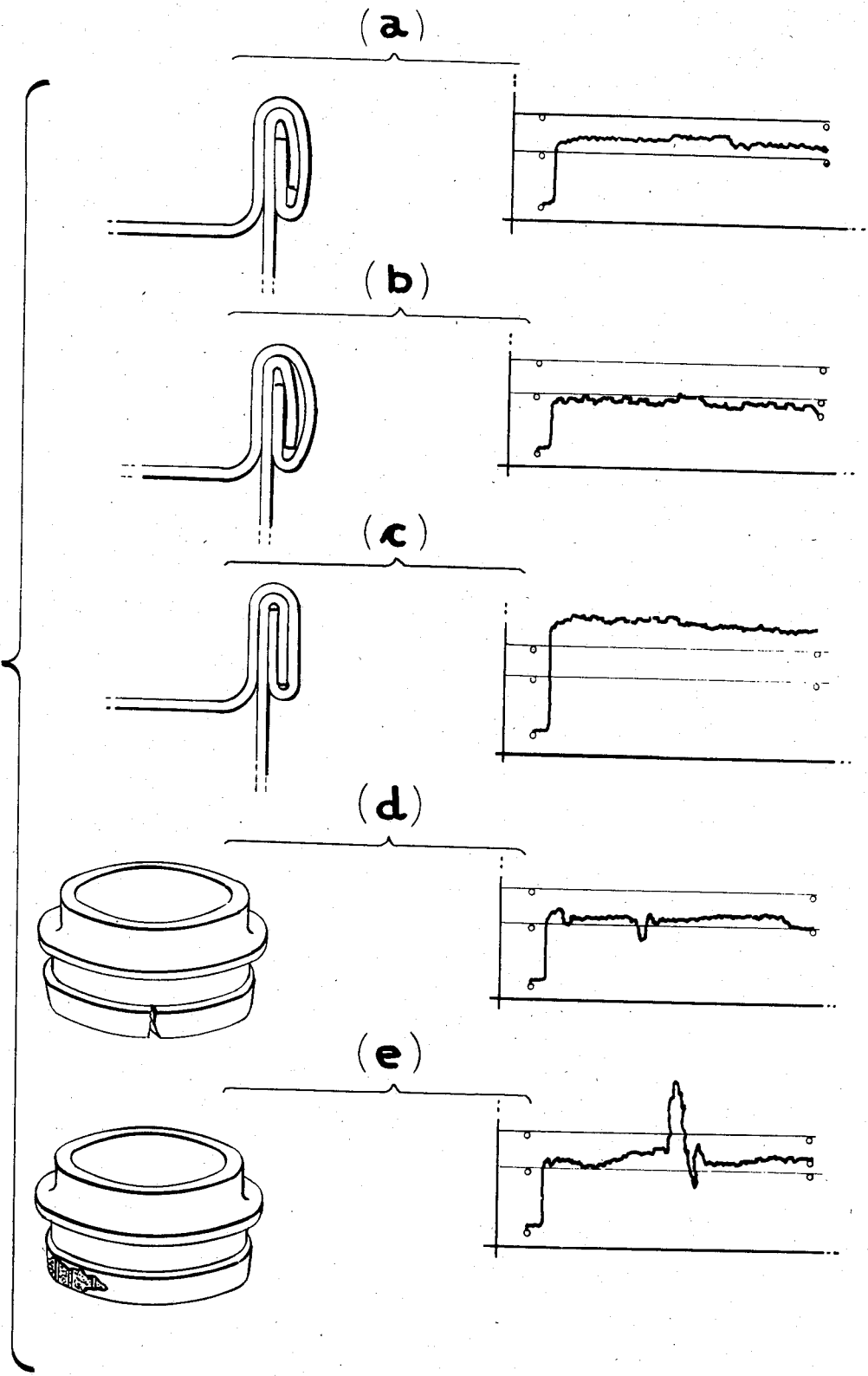
FIG. 6 is a schematic view showing the force curve of the second operation track under different conditions.

Reference is now made to FIG. 6 wherein typical conditions are illustrated. In FIG. 6a there is illustrated a typical passable double seam together with an illustration of the monitored force curve which will be between the two set force limits. No printout will appear on the PRINTER 160 for this force curve.

In FIG. 6b there is illustrated a loose seam and it will be seen that the force curve is below the set lower limit. In such event, there would be a printout as follows:

| Station No. | MACHINE NO. 4 | | Time | Date |
| --- | --- | --- | --- | --- |
| | High Load | Low Load | | |
| 6 | | 275 | 08:32 | 10/07/84 |

With respect to FIG. 6c, there is illustrated an unduly tight seam and the force curve reflects this by being above the upper preset limit. A typical printout for the tight seam would appear as follows:

| Station No. | MACHINE NO. 4 | | Time | Date |
| --- | --- | --- | --- | --- |
| | High Load | Low Load | | |
| 6 | 865 | | 10:14 | 10/07/84 |

In the event the double seam has a part which is loose and a part which is tight, the printout of the PRINTER 160 would indicate both the high force and the low force. On the other hand, if it is desired that the printout include both the high force and the low force even when the high force is below the low force standard or when the low force is above the high force standard, the microcomputer 45 may be set to provide this dual printout.

With reference to FIG. 6d, there is illustrated a chuck which is broken and shows the dip in the force curve which would result from such a broken chuck.

In FIG. 6e, there is illustrated a chuck having a metal build-up thereon and the resultant force curve due to such metal build-up.

It is to be understood that during initial setup of the monitor, the force curve may be unduly distorted and adjustment may be required to bring about a true curve image.

The microcomputer may be adjusted utilizing the OBSERVATION DEVICE 156 as an oscilloscope.

It is to be understood that the values transmitted to the CPU 44 from the ANALOG TO DIGITAL CONVERTER 40 will be modified by a multiplication factor, which is a function of encoder position, so that the values in the CPU 44 prior to the comparison of such values with preset limits, will be true representations of the applied forces.

Although only a preferred embodiment of the invention has been specifically illustrated and described herein, it is to be understood that minor variations may be made in the monitor without departing from the spirit and scope of the invention as defined by the appended claims.

We claim:

1. In a product forming apparatus comprising force applying means for applying a force to the forming apparatus, and monitoring means associated with said force applying means for monitoring the force applied in the forming of a product; said monitoring means including said force applying means having a part deformable under stress during a force application, strain gauge means attached to said part, means connected to said strain gauge means for determining when a fault in the form of a high or a low force is applied through said force applying means, storage means for storing good and fault operations, and means for supplying a fault signal when the relationship of fault to good operations exceeds a preset norm.

2. Apparatus according to claim 1 wherein said means for supplying a signal includes means for expressing faults as a percentage of total operations.

3. Apparatus according to claim 2 wherein said apparatus includes plural like stations utilizing said force applying means, and said monitoring means includes multiple pulsed inputs timed in accordance with operations at said stations, and said storage means includes means for storing separately fault and good operation data for each of said stations.

4. Apparatus according to claim 3 wherein said multiple pulsed inputs include a single pulse input for indicating a first of said plural stations in each cycle of operation.

5. Apparatus according to claim 3 wherein said plural stations rotate, said multiple pulsed inputs include first and second overlapping timewise multiple pulses per revolution for indicating direction of rotation.

6. Apparatus according to claim 5 wherein said multiple pulsed inputs include a single pulse input for indicating a first of said plural stations in each cycle of operation.

7. Apparatus according to claim 5 wherein said multiple pulsed inputs include a single pulse input for indicating a first of said plural stations in each cycle of operation, and one of said first and second overlapping pulses providing for multiple inputs for each operation at each of said plural stations.

8. Apparatus according to claim 1 wherein there is a fault storage and signal means for indicating when there is a preselected number of sequential faults.

9. Apparatus according to claim 3 wherein there is a fault storage and signal means for indicating when there is a preselected number of sequential faults at any one of said stations.

10. Apparatus according to claim 1 wherein said means for supplying a fault signal is connected to separate high and low force indicators for indicating the nature of the fault.

11. Apparatus according to claim 1 wherein said strain gauge means includes two sets of strain gauges with each set including two strain gauges disposed one in the direction of circumferential strain and one in the direction of axial strain.

12. Apparatus according to claim 1 wherein said strain gauge means includes two sets of strain gauges with each set including two strain gauges disposed one in the direction of circumferential strain and one in the direction of axial strain, both of which are the result of the normal applied force, and all of said strain gauges being connected in a bridge.

13. Apparatus according to claim 12 wherein said bridge has an output connected to an analog to digital converter of a microcomputer.

14. Apparatus according to claim 1 wherein said apparatus includes means for folding sheet metal.

15. Apparatus according to claim 1 wherein said force applying means is a cam.

16. Apparatus according to claim 1 wherein said force applying means is a cam, and said sets of strain gauges are spaced along said cam in a direction of movement along said cam.

17. Apparatus according to claim 1 wherein said force applying means is a cam, said cam having a seaming dwell portion and said sets of strain gauges are spaced along said seaming dwell portion.

18. Apparatus according to claim 1 wherein said force applying means is a cam, said cam having a seaming dwell portion and said sets of strain gauges are spaced along said seaming dwell portion, said seaming dwell portion being annular and having an inner surface, said inner surface having a radially outward relief to locally reduce the wall thickness of said seaming dwell portion, and said strain gauges being applied to said inner surface in the reduced wall thickness portion thereof.

19. Apparatus according to claim 15 wherein said apparatus is a double seam forming mechanism for applying end units to can bodies.

* * * * *